(12) United States Patent
Weeks et al.

(10) Patent No.: US 8,742,976 B1
(45) Date of Patent: Jun. 3, 2014

(54) POWER MANAGEMENT FOR A RADAR SYSTEM AND AD HOC NODE DEVICE

(75) Inventors: Steven V. Weeks, N. Andover, MA (US); Paul Dryer, Marshfield, MA (US); Dale G. Robertson, Lowell, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 124 days.

(21) Appl. No.: 13/206,141

(22) Filed: Aug. 9, 2011

Related U.S. Application Data

(60) Provisional application No. 61/371,865, filed on Aug. 9, 2010.

(51) Int. Cl.
*G01S 13/86* (2006.01)

(52) U.S. Cl.
CPC ..................... *G01S 13/86* (2013.01)
USPC .................... 342/52; 342/57; 342/59; 342/82

(58) Field of Classification Search
CPC .......... G01S 13/87; G01S 13/88; G01S 13/86
USPC .................... 342/52, 57, 59, 73, 82
See application file for complete search history.

(56) References Cited

U.S. PATENT DOCUMENTS

| | | | |
|---|---|---|---|
| 7,085,541 B2 * | 8/2006 | Redi et al. ...................... 455/69 |
| 7,944,899 B2 * | 5/2011 | Nordmark et al. ............ 370/338 |
| 8,264,401 B1 * | 9/2012 | Kavaler ......................... 342/128 |
| 8,525,687 B2 * | 9/2013 | Tran .............................. 340/669 |
| 8,531,291 B2 * | 9/2013 | Tran .............................. 340/540 |
| 2009/0046712 A1 * | 2/2009 | Nordmark et al. ............ 370/389 |
| 2010/0303024 A1 * | 12/2010 | Gossain ........................ 370/329 |
| 2012/0032833 A1 * | 2/2012 | Milligan et al. ................ 342/59 |
| 2012/0093078 A1 * | 4/2012 | Perlman et al. ............... 370/328 |
| 2012/0106522 A1 * | 5/2012 | Reumerman et al. ......... 370/337 |
| 2012/0176941 A1 * | 7/2012 | Bata et al. ..................... 370/255 |
| 2012/0307762 A1 * | 12/2012 | Reumerman et al. ......... 370/329 |
| 2012/0327797 A1 * | 12/2012 | Siomina et al. ............... 370/252 |
| 2013/0003591 A1 * | 1/2013 | Novak et al. .................. 370/252 |
| 2013/0005240 A1 * | 1/2013 | Novak et al. ................. 455/11.1 |

FOREIGN PATENT DOCUMENTS

WO    WO 2012092609 A2 *    7/2012

* cited by examiner

*Primary Examiner* — John B Sotomayor
(74) *Attorney, Agent, or Firm* — Chapin IP Law, LLC

(57) ABSTRACT

A method and apparatus for providing power management for a device including a radar unit and an ad hoc network node are presented. The present invention involves various individual components of the device being turned on and off in various sequences in order to minimize power draw of the device. This involves starting individual components ahead of when they are required so they are fully functional when needed.

20 Claims, 6 Drawing Sheets

POWER MANAGEMENT FOR A RADAR SYSTEM AND AD HOC NODE DEVICE

CROSS REFERENCE TO RELATED APPLICATIONS

The present application claims the benefit of U.S. Provisional Patent Application No. 61/371,865, filed on Aug. 9, 2010, which is incorporated herein by reference in its entirety.

BACKGROUND

Networks have become ubiquitous. One type of network is known as a wireless ad hoc network. A wireless ad hoc network is a decentralized wireless network. The network is ad hoc because it does not rely on a preexisting infrastructure, such as routers in wired networks or access points in managed (infrastructure) wireless networks. Instead, each node participates in routing by forwarding data for other nodes, and so the determination of which nodes forward data is made dynamically based on the network connectivity. The decentralized nature of wireless ad hoc networks makes them suitable for a variety of applications where central nodes can't be relied on, and may improve the scalability of wireless ad hoc networks compared to wireless managed networks. Minimal configuration and quick deployment make ad hoc networks suitable for emergency situations like natural disasters or military conflicts.

An ad-hoc network is made up of multiple nodes connected by links. Links are influenced by the node's resources (e.g. available energy supply, transmitter power, computing power and memory) and by behavioral properties (e.g., reliability and trustworthiness), as well as by link properties (e.g. line-of-sight interference, length-of-link and signal loss, interference and noise). Since new and old links can be connected or disconnected at any time, a functioning network must be able to cope with this dynamic restructuring, preferably in a way that is timely, efficient, reliable, robust and scalable.

The network allows any two nodes to communicate, often via other nodes that relay the information. A path is a series of links that connects two nodes. Often there are multiple paths between any two nodes Many of these applications utilize battery-powered nodes whose uninterrupted service life is limited by the energy efficiency of the node itself. As battery technology is not expected to make significant gains in the near future, there has been a wealth of research into software and hardware methods for reducing total energy consumption for multihop wireless networks.

RADAR (radio detection and ranging) is an object detection system that uses electromagnetic waves to identify the range, altitude, direction, or speed of both moving and fixed objects such as aircraft, ships, motor vehicles, weather formations, terrain and people. A radar system has a transmitter that emits radio waves. When they come into contact with an object they are scattered in all directions. The signal is thus partly reflected back and it has a slight change of wavelength (and thus frequency) if the target is moving. The receiver is usually, but not always, in the same location as the transmitter. Although the signal returned is usually very weak, the signal can be amplified through use of electronic techniques in the receiver and in the antenna configuration. This enables a radar unit to detect objects at ranges where other emissions from the target object, such as sound or visible light, would be too weak to detect. Radar uses include meteorological detection of precipitation, measuring ocean surface waves, air traffic control, police detection of speeding traffic, and military applications.

SUMMARY

Conventional mechanisms such as those explained above suffer from a variety of deficiencies. Wireless network nodes are often limited by transmitter power (transmission range) and available energy resources. Transmitter power often consumes the most energy in the node, however, the radio transmitter isn't always the largest consumer of power. If the transmission times are very short, the receiver is the largest consumer since it would be powered on for far longer.

Embodiments of the invention significantly overcome power deficiencies associated with other radar devices, and provide mechanisms and techniques that provide power management in a device comprising a radar unit and an ad hoc network node. The present device comprises a combination featuring a low-power ad hoc network node and a low-power radar unit. The device functions not only as a radar unit but also as a node on an ad hoc network, wherein the node can communicate with other nodes. In this scheme individual components of the device are powered off and require precise timing to know when to power the individual devices on for (potential) events. These events may comprise radio transmit or radio receive events, radar readings, GPS readings or the like.

In a particular embodiment of a method for providing power management for a radar system and ad hoc node device the method includes determining, for a device comprising a combination of a radar unit and a wireless node, at least one predefined sequence for a plurality of components of the device such that the components are fully functional at a proper time for providing a particular function for the device. The method further includes executing a particular one of the at least one predefined sequences, wherein execution of the sequence is performed such that a respective component is fully functional when needed to perform the function, and wherein the component is disabled otherwise such that a minimum amount of power is used by the device for performing a function.

In a second particular embodiment, a method for determining a path between two nodes taking into account the amount of power at a node includes determining a path for a first node of a group of nodes to communicate with a second node of the group of nodes, the path including none or more intermediate nodes, the determining taking into account battery power remaining at each node. The method further includes excluding nodes from being considered as part of the path when the node has power levels below a predetermined threshold.

The features of the invention, as explained herein, may be employed in devices and/or software systems for such devices such as those manufactured by BBN of Cambridge, Mass.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
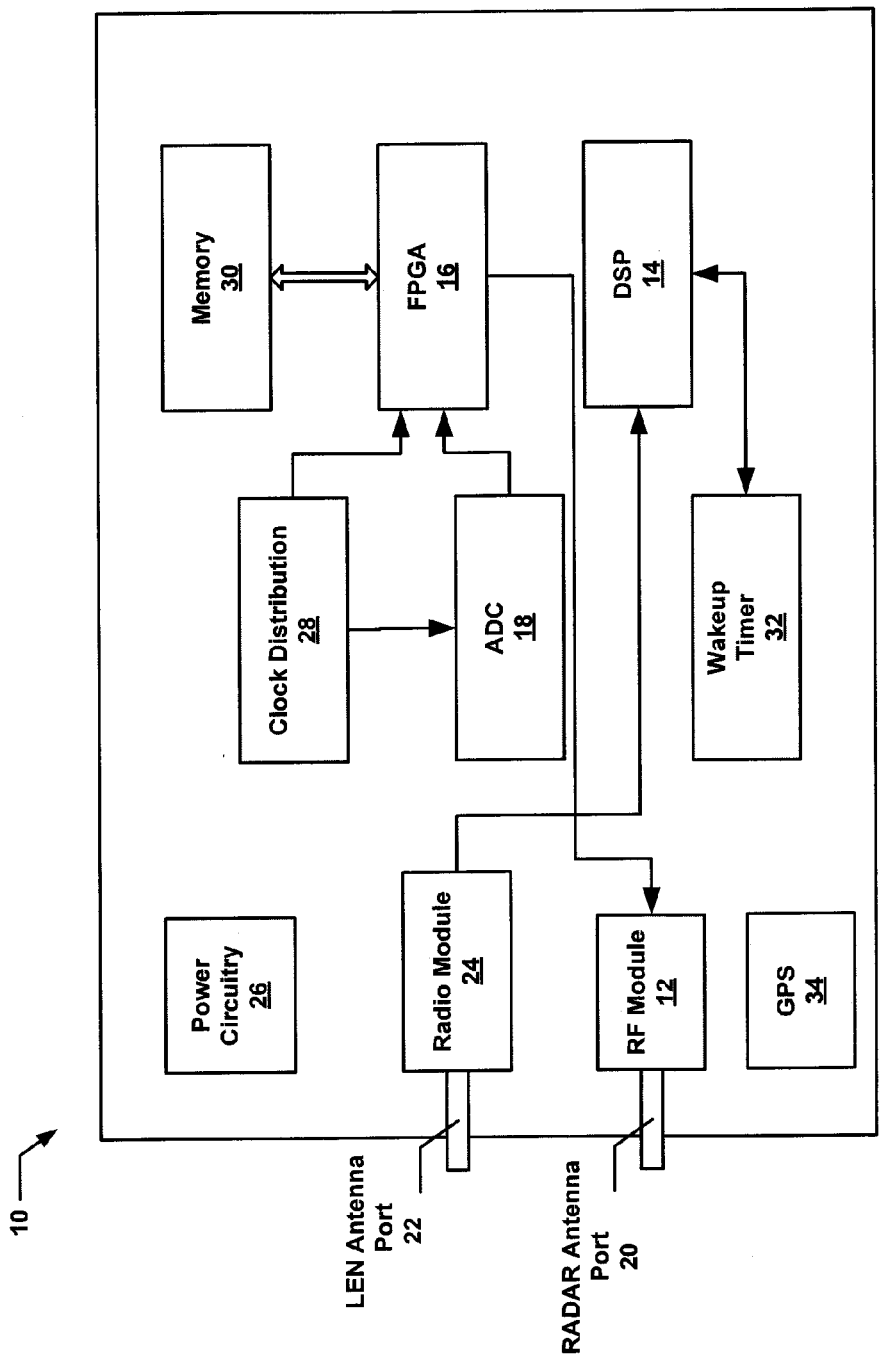
FIG. 1 illustrates an example system architecture for a low energy ad hoc network node and radar unit that performs power management in accordance with embodiments of the invention.

Referring to FIG. 1, a block diagram of a device 10 that includes a low energy ad hoc network node and radar unit that performs power management in accordance with embodiments of the invention is shown. The device 10 includes power circuitry 26 which is used to provide, sequence and control power to various other components of the system. The power circuitry 26 can be armed and disarmed with respect to a position of an external power switch (not shown). The device 10 also includes a Radio Module 24 having a port 22 for a wireless communication antenna (e.g., a Low Energy Network (LEN) antenna). This is used to provide wireless communication with other wireless systems.

An RF module 12 is also shown which has a port 20 for a radar antenna. Also shown is a Global Positioning System (GPS) 34 which his used to provide location information regarding the device 10.

Device 10 further includes clock distribution circuitry 28 for distributing and synchronizing various clocks across the system 10. An Analog to Digital Converter (ADC) 18 is included and a wakeup timer circuit 32 which is used for controlling various components as far as when they should be active.

Device 10 also includes memory circuitry 30 which is used for storing various state and acquired information (e.g. radar events, audio data, video data, GPS position data or the like)) for later retrieval (and/or transmission). Also shown is Field Programmable Gate Array (FPGA) 16 and Digital Signal Processor (DSP) 14.

Figure 2:
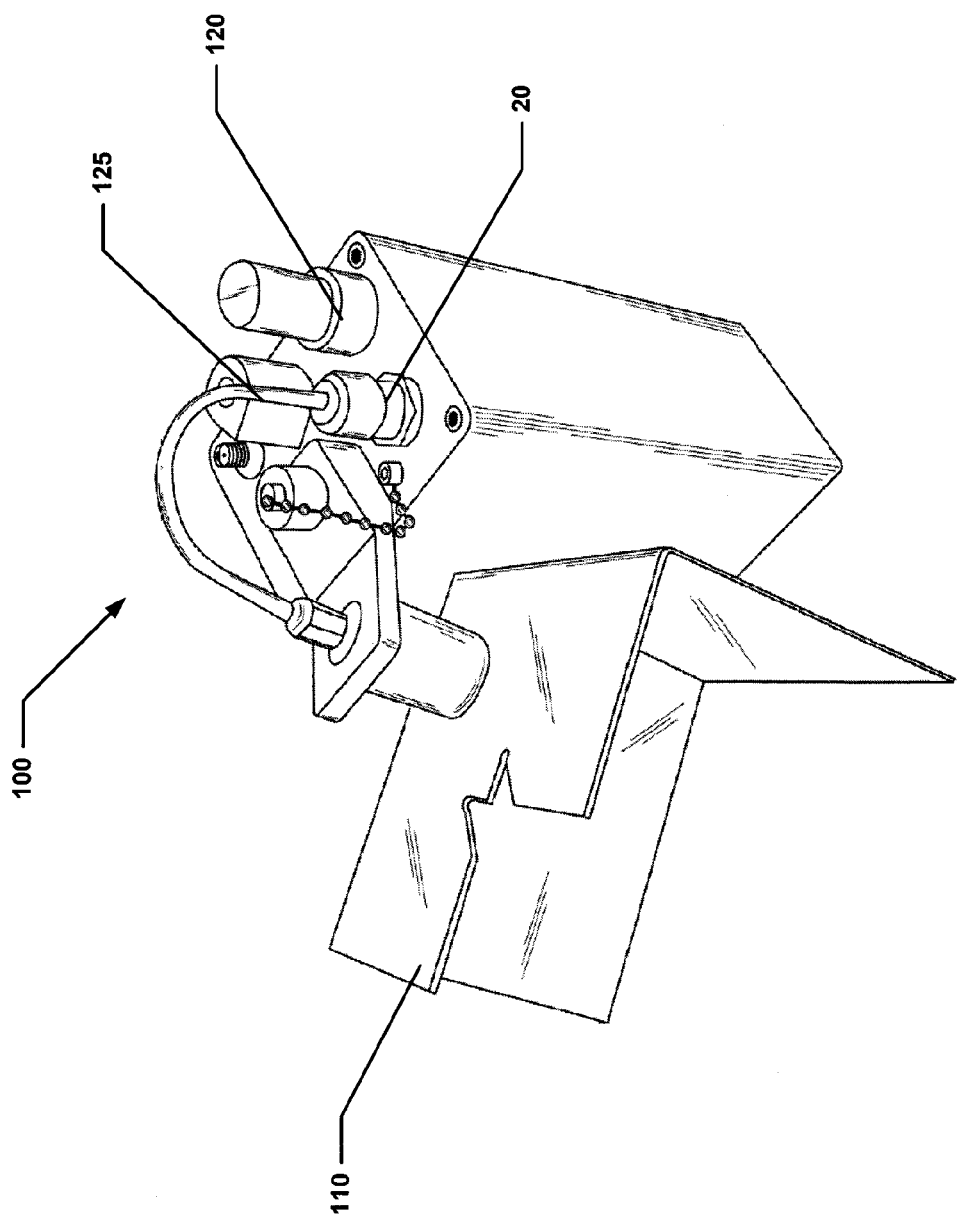
FIG. 2 illustrates an example low energy ad hoc network node and radar unit that performs power management in accordance with embodiments of the invention.

Referring now to FIG. 2, a device 100 comprising a low energy ad hoc network node and radar unit that performs power management in accordance with embodiments of the invention is shown. The device 100 in this example has a radar antenna 110 coupled to the radar antenna port 20. The device 100 in this example also has a LEN antenna 120 coupled to the LEN antenna port (not shown). Also shown is external power switch 125.

The present device comprises a combination featuring a low-power ad hoc network node and a low-power radar unit in a single low energy device. This permits networking of low energy radar units as part of an ad hoc network of devices. The resulting device provides savings in size, weight, and power consumption, allowing the devices to be remotely deployed in a variety of environments. For example, the low energy radar units may be deployed to provide a perimeter around a certain location. The devices can detect a breach of the established perimeter and relay this information back to a command center.

The present invention involves various individual components of the system being turned on and off in various sequences in order to minimize power draw of the system. This involves starting individual components ahead of when they are required so they are fully functional when needed. A predetermined sequence is determined which includes the timing needed to enable certain components to become fully functional such that the device can perform a particular function. For example, the different radar components are sequenced on at the appropriate times so that they are ready when a radar detect operation is about to be performed and then turned off thereafter. The RF module has different scenarios of use (e.g. transmit versus receive) and will turn off various components not required for a certain operation in order to maximize power savings. This sequencing is done at the component level, and not at the board level, providing a finer granularity of control and increased power savings. There may be a particular sequence of devices being turned on or enabled for a radar transmit operation and an entirely different sequence of devices being turned on or enabled for a radar receive operation. In a particular example, a phase locked loop (PLL) of the RF module may need to be enabled earlier than other components in the sequence since the PLL needs a certain amount of time to achieve lock. Otherwise, if they were all enabled as a group, the other components would be idle and consuming power while waiting for the PLL to achieve lock. In certain scenarios, e.g., when the transmit components are only going to be unused for a short duration of time, it may be more advantageous power-wise to leave the PLL enabled and not require the circuit to power off then shortly thereafter power back on and reacheive lock. While examples have been used relating to the radar portion of the device, the concepts apply to other portions of the device as well.

The above described system and methodology can operate with more than one pre-defined sequence or the power up sequence could be modified on the fly based on what the device is going to do after the device enters sleep mode. In this instance the device is woken up with only those components and/or subsystems ready that are required for the desired operation (e.g., radar vs. radio vs. GPS fix etc.).

Referring now to FIG. 2 in conjunction with FIG. 1 an example radar device 100 having different types of transmission functionality (radar, radio, GPS) is shown. Radar device 100 can receive and transmit radar signals using radar antenna 110 and radar antenna port 20. The example illustration shows radar antenna 110 mounted to radar device 100. In alternative embodiments, the radar antenna 110 can be positioned away from radar device 100, such as being positioned in a tree while being connected to radar device 100 via radar antenna port 20. Radar device 100 can also receive and transmit radio communications via radio antenna 120. Radio antenna 120 can be used to receive wireless signals on a short-range radio frequency band, such as from a relatively proximate location. Radar antenna 110 can also function as a GPS antenna in addition to being a radar antenna, or just as a GPS antenna, with radar device 100 having a separate radio antenna.

In a particular example, for a first event component A is powered on at a predetermined time. Shortly thereafter component B is powered on, followed immediately thereafter by component C being enabled. Once component C is turned on, a first event (e.g., a radar event) can be performed. For a second event (e.g., a GPS event) component A is turned on. A predetermined time period later component D is enabled. A predetermined third period of time thereafter component E is turned on, as is component F. At this point in time a GPS event can take place.

Figure 3A:
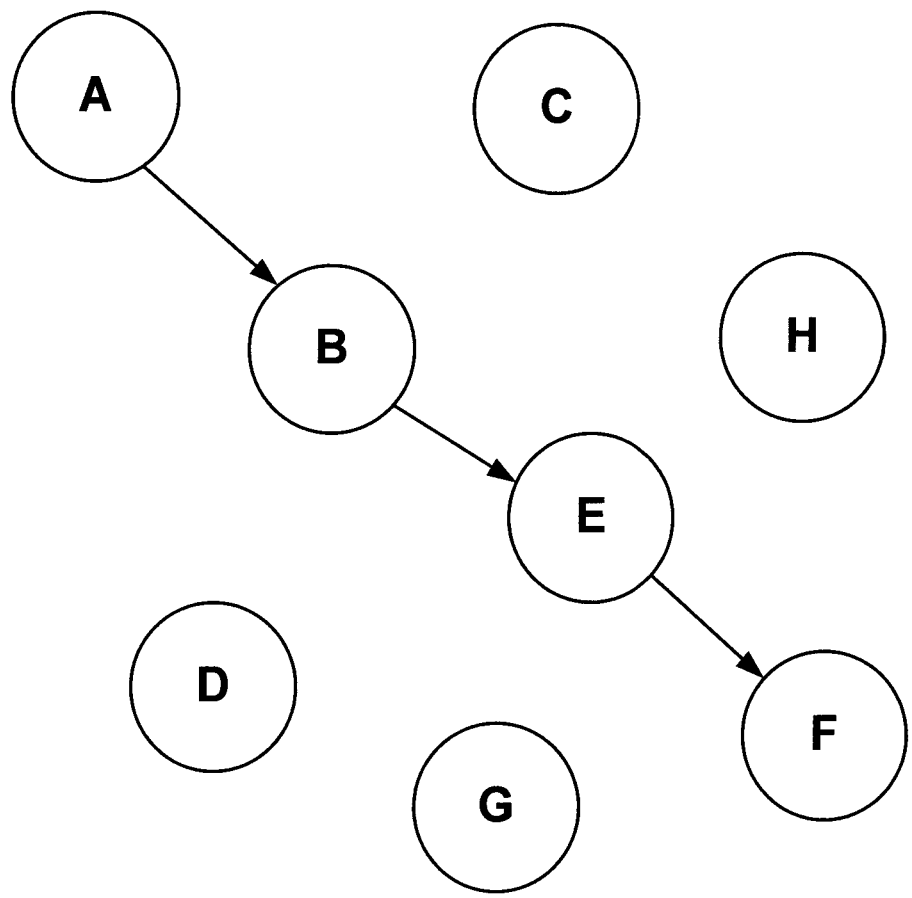
FIGS. 3A and 3B comprise a diagram showing a plurality of nodes and a selected path between certain nodes in accordance with embodiments of the invention.
Figure 3B:
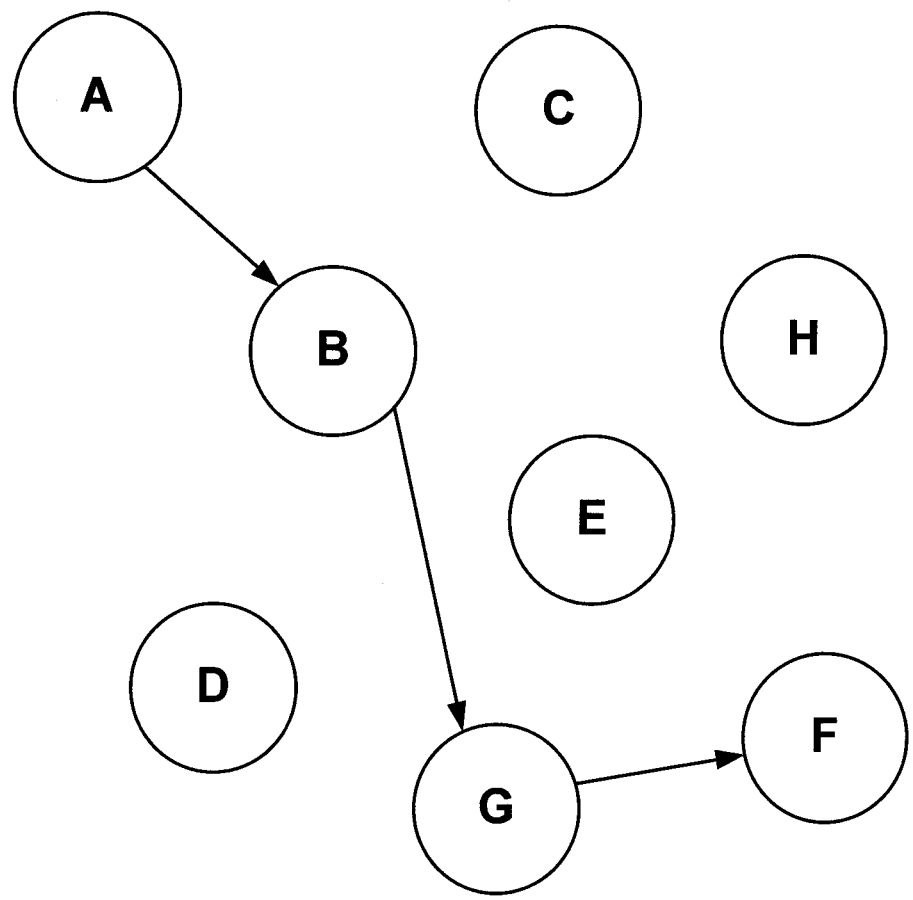

Referring now to FIGS. 3A and 3B, a diagram showing nodes involved in determining a path between two nodes taking into account the amount of power at a node is shown. The nodes find out about each other and determine the most efficient path for a node (origination node) to communicate with another node (destination node). Here, a plurality of nodes (A-F) are deployed. Node A is the origination node and node A intends to send a message to Node F (the destination node). There are a variety off paths that could be taken to communicate the massage from Node A to Node F. The path may include several intermediate nodes between the origination node and the destination node. The most direct path would be from Node A to Node B, Node B to Node E, and from Node E to Node F.

Referring now to FIG. 3B, embodiments of the present invention take into account the battery power remaining at a node in the determination of the optimal path between nodes wherein if a node has low battery power remaining, that node will be excluded from the group of nodes used. As shown here, Node E has low battery power remaining, so Node E is excluded from a path between Node A to Node F. The new path would be from Node A to Node B, Node B to Node G, and from Node G to Node F. IN such a manner a node having low power is not included in the path determination from an origination node to a destination node.

Figure 4:
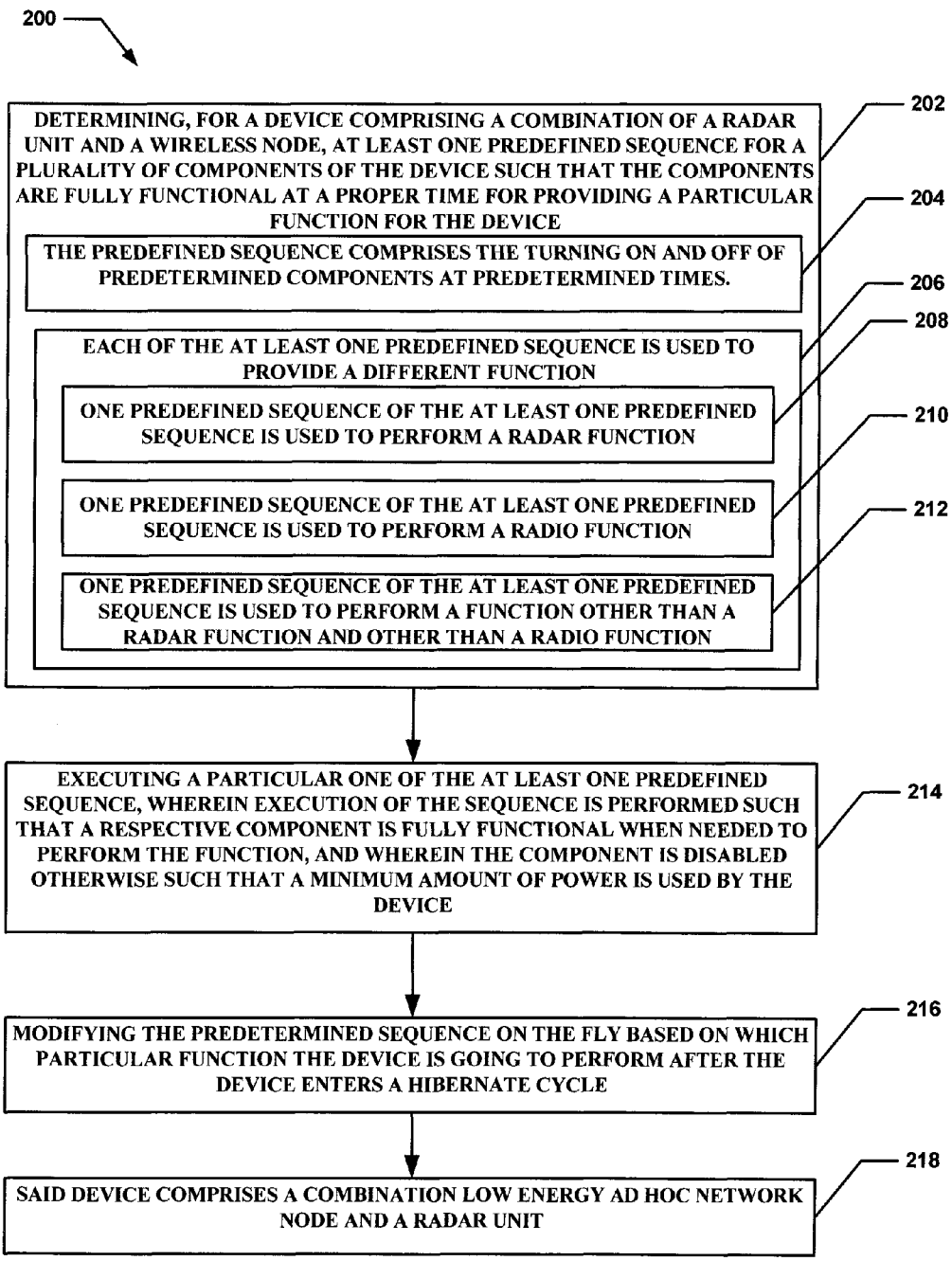
FIG. 4 comprises a flow diagram of a particular embodiment of a method for performing power management for a radar system and ad hoc node device in accordance with embodiments of the invention.
Figure 5:
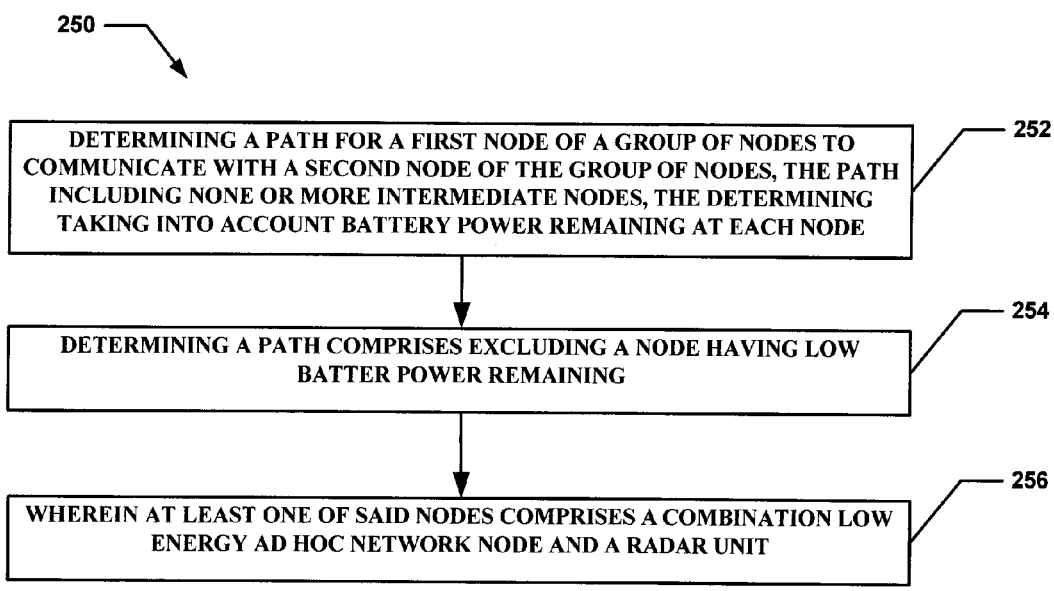
FIG. 5 comprises a flow diagram of a particular embodiment of a method for determining a path between nodes taking into consideration the power level at each node in accordance with embodiments of the invention.

Flow diagrams of particular embodiments of the presently disclosed methods are depicted in FIGS. 4 and 5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular embodiment of a method 200 for performing power management for a radar system and ad hoc network device is shown. Method 200 begins with processing block 202 which discloses determining, for a device comprising a combination of a radar unit and a wireless node, at least one predefined sequence for a plurality of components of the device such that the components are fully functional at a proper time for providing a particular function for the device. As shown in processing block 204, the predefined sequence comprises the turning on and off of predetermined components at predetermined times.

Processing block 206 states wherein each of the at least one predefined sequence is used to provide a different function. As shown in processing block 208 one predefined sequence of the at least one predefined sequence is used to perform a radar function, as shown I processing block 210 one predefined sequence of the at least one predefined sequence is used to perform a radio function, and as shown in processing block 212 one predefined sequence of the at least one predefined sequence is used to perform a function other than a radar function and other than a radio function.

Processing block 214 recites executing a particular one of the at least one predefined sequence, wherein execution of the sequence is performed such that a respective component is fully functional when needed to perform the function, and wherein the component is disabled otherwise such that a minimum amount of power is used by the device.

Processing block 216 discloses modifying the predetermined sequence on the fly based on which particular function the device is going to perform after the device enters a hibernate cycle. Processing block 218 recites wherein said device comprises a combination low energy ad hoc network node and a radar unit.

Referring now to FIG. 5, a particular embodiment of a method 250 for determining a path between nodes taking into consideration the power level at each node is shown. Method 200 begins with processing block 202 which discloses determining a path for a first node of a group of nodes to communicate with a second node of the group of nodes, the path including none or more intermediate nodes, the determining taking into account battery power remaining at each node.

Processing block 254 states determining a path comprises excluding a node having low batter power remaining. Processing block 256 recites wherein at least one of said nodes comprises a combination low energy ad hoc network node and a radar unit.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method in which a device performs operations comprising:
    determining, for a device comprising a combination of a radar unit and a wireless node, at least one predefined power sequence for a plurality of components of said device such that said components are fully functional at a proper time for providing a particular function of said device; and
    executing a particular one of said at least one predefined power sequence, wherein execution of said at least one predefined power sequence is performed such that a respective component is fully functional when needed to perform said function, and wherein said component is disabled otherwise such that a minimum amount of power is used by said device.

2. The method of claim 1 wherein said predefined sequence comprises the turning on and off of predetermined components at predetermined times.

3. The method of claim 1 further comprising modifying said predefined sequence on the fly based on which particular function said device is going to perform after said device enters a hibernate cycle.

4. The method of claim 1 wherein each of said at least one predefined sequence is used to provide a different function.

5. The method of claim 4 wherein one predefined sequence of said at least one predefined sequence is used to perform a radar function.

6. The method of claim 4 wherein one predefined sequence of said at least one predefined sequence is used to perform a radio function.

7. The method of claim 4 wherein one predefined sequence of said at least one predefined sequence is used to perform a function other than a radar function and other than a radio function.

8. The method of claim 1 further comprising providing said device including a combination low energy ad hoc network and radar unit.

9. A method comprising:
    determining a path for a first node of a group of nodes to communicate with a second node of said group of nodes, said path including one or more intermediate nodes, said determining taking into account battery power remaining at each node, wherein said determining a path comprises excluding a node having low battery power remaining.

10. The method of claim 8 wherein at least one node comprises a combination low energy ad hoc network and radar unit.

11. An apparatus comprising:
    a radio module comprising a plurality of radio module components;
    a Radio Frequency (RF) module comprising a plurality of RF module components;
    power circuitry in communication with said radio module and said RF module; and
    a wakeup timer in communication with said power circuitry, said radio module, and said RF module, wherein the wakeup timer is operative to execute at least one predefined power sequence for at least one of said plurality of radio module components and said plurality of RF module components of said apparatus such that said components are fully functional at a proper time for providing a particular function for said device.

12. The apparatus of claim 11 wherein said wakeup timer is further operative to execute said at least one predefined power sequence including the turning on and off of predetermined components at predetermined times.

13. The apparatus of claim 11 wherein said wakeup timer is further operative to modify one of said at least one predefined power sequence on the fly based on which particular function said apparatus is going to perform after said apparatus enters a hibernate cycle.

14. The apparatus of claim 11 wherein said wakeup timer is further operative to execute each of said at least one predefined power sequence is used to provide a different function.

15. The apparatus of claim 14 wherein said wakeup timer is further operative to execute one predefined power sequence of said at least one predefined power sequences to perform a radar function.

16. The apparatus of claim 14 wherein said wakeup timer is further operative to execute one predefined power sequence of said at least one predefined power sequence to perform a radio function.

17. The apparatus of claim 14 wherein said wakeup timer is further operative to execute one predefined power sequence of said at least one predefined power sequence to perform a function other than a radar function and other than a radio function.

18. The apparatus of claim 11 wherein said apparatus comprises a combination low energy ad hoc network node and radar unit.

19. A system comprising:
a plurality of nodes wherein one of said plurality of nodes is designated an origination node, and another one of said plurality of nodes is designated a destination node, and further including one or more other nodes;
wherein a path between said origination node and said destination is determined, said path including one or more of said other nodes, wherein said path takes into account battery power remaining at each node and wherein a node having low battery power remaining is excluded from said path.

20. The system of claim 19 wherein at least one of said nodes comprises a combination low energy ad hoc network and radar unit.

\* \* \* \* \*